United States Patent
Craven

(10) Patent No.: US 9,932,713 B2
(45) Date of Patent: Apr. 3, 2018

(54) METHOD OF FORMING A SUBSTRATE FOR A SPORTS SURFACE OF A SPORTS PITCH, SUCH A SUBSTRATE AS WELL AS A SPORTS PITCH PROVIDED WITH SUCH SUBSTRATE

(71) Applicant: Ten Cate Thiolon B.V., Nijverdal (NL)

(72) Inventor: Robin John Craven, Kidderminster (GB)

(73) Assignee: Ten Cate Thiolon B.V., Nijverdal (NL)

( * ) Notice: Subject to any disclaimer, the term of this patent is extended or adjusted under 35 U.S.C. 154(b) by 0 days.

(21) Appl. No.: 15/001,769

(22) Filed: Jan. 20, 2016

(65) Prior Publication Data

US 2016/0138227 A1    May 19, 2016

Related U.S. Application Data

(63) Continuation of application No. 14/009,985, filed as application No. PCT/NL2012/050217 on Apr. 2, 2012, now Pat. No. 9,260,823.

(30) Foreign Application Priority Data

Apr. 5, 2011 (GB) .................................. 1105755.1

(51) Int. Cl.
*A63C 19/02* (2006.01)
*E01C 13/00* (2006.01)
(Continued)

(52) U.S. Cl.
CPC ................ *E01C 13/08* (2013.01); *B29B 9/08* (2013.01); *B29B 9/16* (2013.01); *B29B 17/0026* (2013.01);
(Continued)

(58) Field of Classification Search
CPC ......... A63C 19/00; A63C 19/02; A63C 19/06; A63C 19/08; A63C 19/10; E01C 13/00; E01C 13/08; E01C 13/083
(Continued)

(56) References Cited

U.S. PATENT DOCUMENTS 5,514,722 A     5/1996  Di Geronimo
7,488,525 B2 *  2/2009  Bird ....................... A63G 31/00
                                                          428/44
(Continued)

FOREIGN PATENT DOCUMENTS

DE           19723530 A1    12/1997

OTHER PUBLICATIONS

English translation of Russian Official Action, dated Mar. 18, 2016, for Application No. 2013144964/03 (069530).
English Translation of DE 19723530 A1.

*Primary Examiner* — Kien Nguyen
(74) *Attorney, Agent, or Firm* — NLO N.V.; Catherine A. Shultz

(57) ABSTRACT

A method of forming a substrate for a sports surface of a sports pitch includes the steps of: a) Agglomerating plastics materials; b) Granulating the agglomerated plastics materials to form granules having a predetermined range of sizes; c) In situ coating the granules with a binding material so that they form a fluent material; d) Forming a layer of the fluent material on the site of the sports pitch; and e) Setting the laid material such that the granules adhere where they contact each other to form a voided water permeable structure.

20 Claims, 11 Drawing Sheets

(51) Int. Cl.
    *E01C 13/08*     (2006.01)
    *B29B 17/00*     (2006.01)
    *E01C 13/02*     (2006.01)
    *B29B 9/08*     (2006.01)
    *B29B 9/16*     (2006.01)

(52) U.S. Cl.
    CPC .......... *B29B 17/0036* (2013.01); *E01C 13/00* (2013.01); *E01C 13/02* (2013.01); *B29B 2009/163* (2013.01); *Y02W 30/62* (2015.05); *Y10T 428/249982* (2015.04)

(58) Field of Classification Search
    USPC .............................................. 472/85–92, 94
    See application file for complete search history.

(56) References Cited

U.S. PATENT DOCUMENTS

| | | |
|---|---|---|
| 7,585,555 B2 | 9/2009 | Stroppiana |
| 2010/0102468 A1 | 4/2010 | Chen |
| 2010/0151158 A1* | 6/2010 | Mashburn ........... B29B 17/0206 428/17 |

* cited by examiner

METHOD OF FORMING A SUBSTRATE FOR A SPORTS SURFACE OF A SPORTS PITCH, SUCH A SUBSTRATE AS WELL AS A SPORTS PITCH PROVIDED WITH SUCH SUBSTRATE

CROSS-REFERENCE TO RELATED APPLICATIONS

This application is a continuation of U.S. patent application Ser. No. 14/009,985, filed Dec. 4, 2013, which it the National Stage of International Application No. PCT/NL2012/050217, filed Apr. 2, 2012, which claims the benefit of Great Britain Application No. GB 1105755.1, filed Apr. 5, 2011, the contents of all of which are incorporated by reference herein.

FIELD OF THE INVENTION

The invention relates to a method of forming a substrate for a sports surface of a sports pitch.

The invention also relates to a substrate obtained with the method according to the invention.

Furthermore the invention also relates to a sports pitch provided with such substrate.

BACKGROUND OF THE INVENTION

Many sports, such as field hockey, tennis, American football etc are currently played on artificial turf (grass) sports pitches, which in general comprising a carrier as well as artificial fibres extending from said carrier. Said carrier is placed on a substrate which forms a stable subsurface base construction for the complete pitch installation.

Examples of sports that utilise such artificial turf pitch (ATP) constructions are:
Soccer
American Football
Australian Rules Football
Gaelic Football/Hurling (GAA)
Rugby Union/League
Hockey
Cricket outfields etc In addition to sports pitches, the basic methodologies explained above also apply to other smaller areas in which artificial turf maybe used. For example:
Play grounds
Landscape/leisure areas
Cricket wickets
Bowls rinks
Tennis courts
Futsul courts
Education multiple use areas The traditional base construction methodology for artificial turf systems has historically been based around the excavation of the existing sub-base and the subsequent replacement of this sub-base with graded rock and specially designed drainage systems.

There has been substantial development in construction methodologies and systems that are designed to limit and/or replace the use and design of traditional base construction system. These systems have been primarily designed to reduce the cost and to simplify the work untaken.

Due to the increasing awareness of human activity on the environment, the issue and practice of recycling has become more popular. In many cases governments are now legislating for the increased practice of recycling end of life and waste materials. This practice is seen at all levels of society and business, from road side recycling of household waste to legal obligations and quotas on businesses to recycle or dispose of waste in an environmentally responsible manner. This has also become a key political issue and the general trend of thinking is to reduce waste, carbon footprint, as well as waste to traditional landfill. National and local governments, plus private contractors have developed large infrastructures in order to divert some materials away from landfill for the purpose of recycling.

A new industry has developed which has been improving and developing methods of collection, separation and industrial processes that increase the ability to reclaim key materials from waste sources. One of the largest parts of the recycling industry is the recycling of plastics. However, these companies tend to process materials that are easy to convert and have the highest grades and re-sale value.

The vast majority of waste plastics is mixed (co-mingled) and as such is difficult to identify, sort, separate, clean and recycle and is therefore too expensive to process. In addition, the grades of these materials are very low and therefore have little re-sale value and are therefore regarded as "end of life" plastics.

Such 'end of life' plastic materials are typically in the form of packaging materials, moulded articles, products, profiles, sheet, coatings, fabrics or fibers and are found in general industrial, manufacturing, building and household waste etc. They can broadly be described as:

Plastic granules, beads, pellets, slivers, flakes, chips and noodles derived from recycling plastics. These types of plastics cover all families of polymers defined as plastics, such as, but not limited to the families of Polyolefin, Polyesters, Polyamides, Poly Vinyl Chlorides (PVC's), Polystyrenes and Polyurethanes found in general industrial, manufacturing, land transportation, aerospace, agricultural, horticultural, food and general packaging, building and household waste. Also, sources such as material reclaimed from landfill and material retrieved/harvested from the oceans in the form of flotsam and jetsam.

Plastic granules, beads, pellets, slivers, flakes and noodles derived from recycling artificial grass surfaces, domestic and industrial floorings. The types of plastics cover of the families of Polyolefin, Polyesters, Polyamides, PVC's, Polystyrenes and Polyurethanes.

This material is referred to as "Feedstock" and there are vast quantities of this material available. Feedstock will generally consist of a random mix of plastic types, sizes, densities, colours; in a form of being flexible, rigid, semi rigid, filled or expanded in character or nature and are likely to include thin sheets, film, fibers, etc.

As such, to be made suitable for use in the formation of the invention the feedstock material must be processed using mechanical methods which result in a granulate with a more consistent size, bulk density and volume. Such processes are known as densification or agglomeration.

Densification or agglomeration is a process well known in the recycling plastics industry, in which plastics are chopped into fine flakes and then fed into a machine which uses friction to convert them into a semi molten state. The fine flakes join together increasing the mass and density of the material flowing through the machine. The mass of plastics exiting the machine is cooled, chopped, granulated or otherwise comminuted to a predetermined size. The densifying process includes one or more sieving stages whereby granulate which is considered to be outside the predetermined useful range is automatically returned to the infeed of the densifying process. In the vast majority of plastics recycling the aim for the processor is to ensure the plastic material been put into the process is of the same polymer type and the material is totally free from other polymer types and totally clean. As explained previously this requires a great deal of pre-processing to ensure that the final granules are fit for sale to the plastic industry, much of the waste plastic collected is either to dirty, too mixed or be at the end of the ability to re-recycle to be of any commercial value, and is therefore landfilled and burnt.

SUMMARY OF THE INVENTION

For the purposes of the invention the plastic material (referred to above as Feedstock) used in the agglomeration process can be any type of plastics and the presence of some foreign materials which are non-plastic (e.g. wood, paper, fibres) are not an issue, therefore the amount of pre-processing is reduced and increased quantities of material due for landfill or burning are reused.

To be considered suitable for use in the formation of the invention, the densified plastic granulate shall be of a size whereby the ratio of the largest dimensional plane of each granule (x) and its perpendicular dimensions (y and z) are at least 30% to 100% of the largest dimensional plane.

The cornerstone of the invention is to use the Feedstock plastic, which is then agglomerated into granules and then used in the construction of base construction profiles in the applications described in the background section above.

The basis of the invention is to create a system which provides an option for either an in-situation or a pre-formed module which has the properties of base point loading, compression strength, in-built porosity and controlled/managed drainage, plus in-built shock absorption.

The system is designed to limit the environmental impact and carbon footprint of the base construction element while reducing the financial cost of the project. The system will reduce the amount of spoil removed from site by reducing the required excavation depths (depending on pre-existing geological conditions). Although certain aspects of the traditional base profile will still be required, the amount of rock required to build up the base profile will be significantly reduced. There will still be a requirement for the geo-textile membrane and the non-porous capping layer.

In order the achieve the desire properties, balanced against the existing geological conditions and the reduction of environmental construction impacts, the invention uses the granules as the aggregate material which in turn is bound together in order to stabilise the structure, resulting in a substrate layer according to the invention.

The binding materials can be Polyurethane, Bitumen or Polyofin displacements, which are mixed (either hot or cold) with the granules at ratios depending on application and property requirements. Such binders are characterised to impart thermal stability, hydrolytic stability, having no significant change in properties upon being submerged in water or exposed to changing humidity and temperature environments. Thus the desired structural integrity and physical properties remain on standing and when in use.

The granules are in a loose granule form and depending on the application and properties required the size range of the granules is between 0.5 mm to 20 mm. The ratio or particle range of these sizes is adjusted depending on the properties required. Added to this is the binding material which is added using formulas based on weight of the granules. These ratios range between 8% binder by weights to 30% binder by weight.

The invention will be made in a porous permeable form by using proportions of granules and binder so that sufficient void or interstitial space remains between the granules. This void space can vary in amount in accordance with the particulate which is used for example between 15% to 60% by volume. Such void space will be an advantage to allow drainage in all directions, vertically and laterally.

Void space can also be used to provide storage or attenuation of water if is so necessary.

BRIEF DESCRIPTION OF THE DRAWINGS

The invention will now be discussed in the detailed figurative description below, wherein.

DETAILED DESCRIPTION OF THE INVENTION

Figure 1:
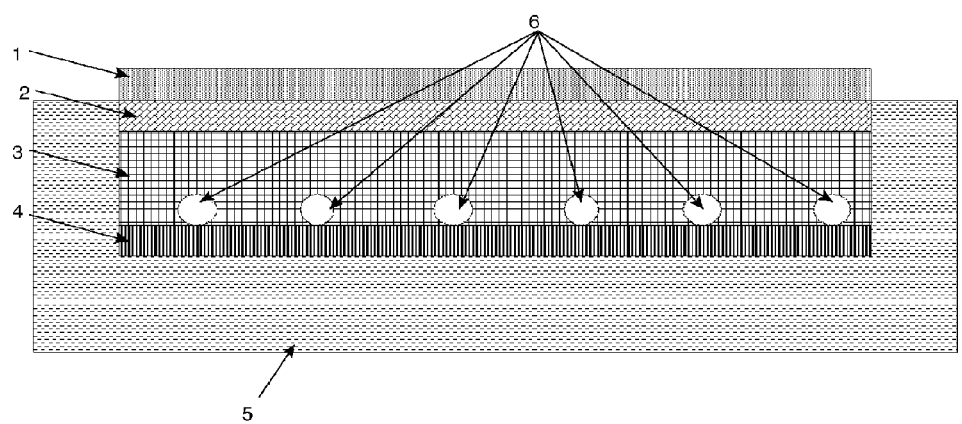
FIG. 1 represents the cross-section of a typical, known dynamic base construction profile according to the state of the art.

For example FIG. 1 represents the cross-section of a typical, known dynamic base construction profile according to the state of the art:
1. Turf surface
2. Loose stone binding
3. Grade rock sub-base
4. Non-porous capping layer
5. Natural soils
6. Field water drains When constructing an ATP according to the state of the art, many projects are referred to as 'full build' projects, which are defined as new-build pitches constructed on a virgin site and include the construction of a stable sub-grade, drainage system, porous base, optional shock absorption layer and finally the artificial turf surface.

The start of the construction process is to remove a pre-determined depth of existing sub-soils 5. This depth is determined by a geological survey which measures and classifies the conditions on that particular site. These conditions relate to the make up of the existing sub grades, plus local drainage, rainfall and general location factors. From this data the depth of excavation and the profile of the base construction can be designed.

The depth and therefore the volume of spoil 5 removed can be quite wide-ranging. However an average of 0.5 meters depth of removal is usually performed. It is also assumed that the average sized ATP would be 6000 square meters ($m^2$). As a consequence, the amount of spoil to be removed from a 6000 $m^2$ pitch construction would be 3000 $m^3$. Typically, all spoil is transported to landfill, hence a large cost in transportation, landfill fees and impact on the environment.

In order to prevent water movement from the sub-soil base into the new base construction, a capping layer of geo-textile 4 and specially graded rock/dust 3 must be installed before the main body of the new base is constructed. Over the top of this capping layer 4 is installed a drainage system 6, which is designed to remove water permeating down through the upper rock sub-base by means of drainage pipes in the field pattern. These pipes lead the water off the playing area into ring main land drains or similar water drainage control systems. In some cases water is piped into storage facilities and re-circulated back on to the pitch, either as part of the turf system performance or for use as cooling during hot weather.

The excavated area (with capping layer 4) now needs to be in filled with layers of specially graded rock 2 and 3 which will provide a stable, free draining platform on which to install the playing surface 1. The rock has to be sourced and graded to a particular specification and this rock needs to be transported to site, in filled, levelled and compacted. In some cases the correct rock specification may only be available in certain quarries, which in turns adds to the cost and environmental impact.

Most standard ATP systems are designed to have either a 'dynamic' or 'engineered' base construction. However there are some variations which are deemed acceptable in some localised markets around the world.

Dynamic bases (also known as un-bound bases) are defined as base profiles that have a loose rock construction 2 throughout and are topped with a compacted, rock binding layer. This binder layer consists of fine graded rock dust and is designed to be stable and free draining.

Figure 2:
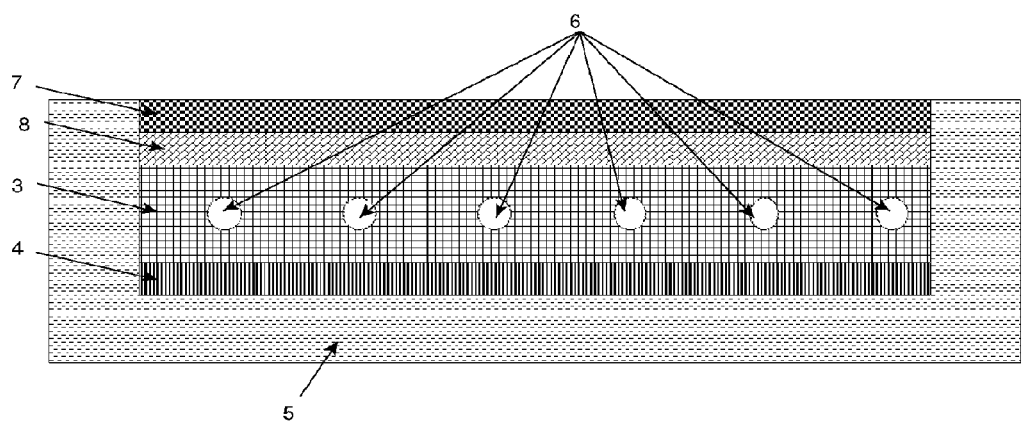
FIG. 2 represents the cross-section of a typical, known engineered base construction with shock pad profile.

FIG. 2 represents the cross-section of a typical, known engineered base construction with shock pad profile:

7. Asphalt wearing course
8. Asphalt load bearing layer
3. Graded rock sub-base
4. Non-porous capping layer
5. Natural soils
6. Field water drains Although engineered bases (also known as bound bases) still have the loose rock construction 2 as described above with reference to FIG. 1, instead of being topped with the loose binding layer, they are typically topped with two layers of porous asphalt, indicated with reference numerals 7 and 8.

The first layer or levelling/load bearing layer 8 consists of a certain consistent rock grade bound with bitumen laid at an average depth of 25 millimeters (mm). The second layer, known as the wearing course 7 is paved over the first asphalt layer 8 and consists of a finer graded rock bound with bitumen.

There are strict tolerances required when installing this upper wearing course 7 which ensures the finished surfaces is level and free from ridges, dips and bumps. This critical element requires expensive paving machinery which is operated by highly skilled workers and is a considerable cost in the overall base construction. Furthermore, it is a time consuming process.

It is a common occurrence for the upper wear layer 7 to be installed outside acceptable tolerances and therefore requires extensive remedial works. These works add un-budgeted cost to the project and impact on the project on time completion mandates.

Figure 3:
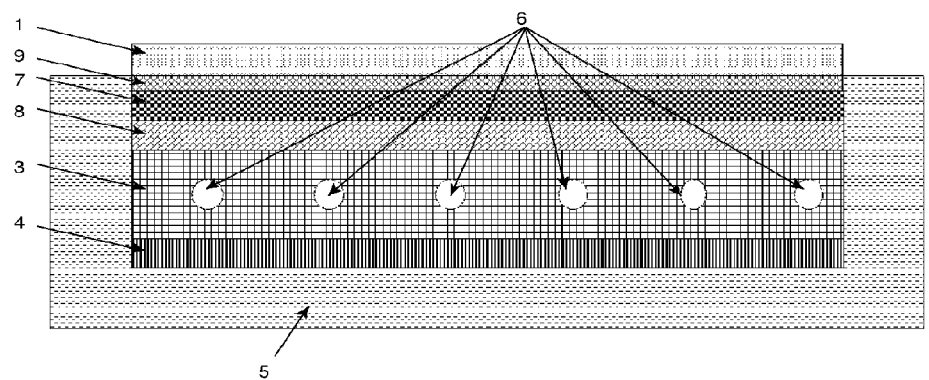
FIG. 3 represents the cross-section of another typical, known engineered base construction with in-situation shock pad profile.
Figure 4:
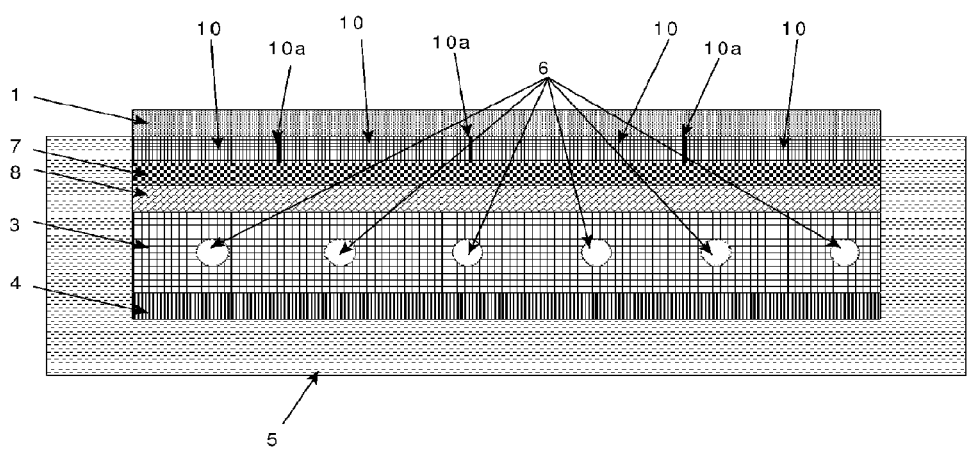
FIG. 4 represents the cross-section of another typical, known engineered base construction with preformed shock pad profile.

Depending on the type of artificial turf system to be installed a shock absorption layer 9 or 10 (see FIGS. 3 and 4) maybe required over the completed base construction 7-8-3-4. There are a very wide range of 'shock pad' systems available that generally fall into two main categories:

In-situation as shown in FIG. 3
Pre-formed as shown in FIG. 4

FIG. 3 represents the cross-section of a typical, known engineered base construction with in-situation shock pad profile:

1. Turf surface
9. In-situation shock pad
7. Asphalt wearing course
8. Asphalt load bearing layer
3. Graded rock sub-base
4. Non-porous capping layer
5. Natural soils
6. Field water drains The in-situation pads 9 of the FIG. 3 embodiment are defined as pads that are installed on-site by a machine directly onto the base construction. The vast majority of in-situation pads are paved directly onto the dynamic or engineered base construction and use a combination of rubber granules mixed with a Polyurethane binder.

The rubber granules used in such pads are generally sourced from recycled/granulated car and truck tyres and are referred to as Styrene-Butadiene-Rubber (SBR) granules. In some markets a small ratio of pea gravel is mixed with the rubber and again bound with Polyurethane binder. The mixture is laid onto the base construction with a specialised paving machine, which controls the depth and evenness of the shock pad.

An advantage of this form of installation is that the pad 9 is attached to the base construction 7-8-3-4 and is therefore dimensionally stable both during installation and during the play life of the pitch. There are no seams or joints in this form of pad and therefore limited potential for failure.

This process requires highly specialised equipment, operated by highly skilled workers. As in the laying of the asphalt wear layer 7 the tolerances required are very strict and often remedial work is required.

FIG. 4 represents the cross-section of a typical, known engineered base construction with preformed shock pad profile:

1. Turf surface
10. Preformed Shock pads
7. Asphalt wearing course
8. Asphalt load bearing layer
3. Graded rock sub-base
4. Non-porous capping layer
5. Natural soils
6. Field water drains Pre-formed shock pads 10 are pads that have been manufactured away from the work site by companies who specialise in this area. Although this form of shock pad 10 can also be produced from SBR rubber and Polyurethane binder, other pre-formed systems use a much wider range of materials. These alternative systems comprise many other shock absorbent materials such as open and closed cell foams, felts, three-dimensional random or woven matrices, all of which can be constructed with either virgin of recycled materials.

As pre-formed products are made in a controlled factory environment the tolerances of thickness, density and performance can be controlled. The system can be made into a variety of formats, but the most common are rolls or panels. These rolls or panels 10 are delivered to the work site and installed onto the base construction by various techniques by the workers who generally install the turf. Little specialised installation equipment is required and the work skill level is reduced. As the products are manufactured under controlled environments the strict tolerances of conformity are easier to meet with limited remedial work required.

However, the drawbacks for this type of pad tend to be around the added cost of transportation from the manufacturing site to the work site. These pad formats tend to be quite bulky and this in turn limits the how many square meters can be loaded per container or truck.

In addition, pre-formed pads 10 can suffer from dimensional instability and movement during turf installation and during the playing life of the pitch. There is also a potential for failure in the joints or seams 10a created during installation. Furthermore, any small undulations in the base/sub-base 7-8-3-4 cannot be 'masked' or levelled by the pre-formed layer 10 as they are a constant thickness.

In general terms pre-formed shock pads 10 (FIG. 4) are a more expensive system when compared to in-situation pads 9 (FIG. 3).

It is worth noting that the base construction profiles and methodologies described above accounts for approximately 40-50% of the entire cost of the project.

Due to surface usage demands and the sports/bio-mechanical requirements specified by sports governing bodies, the use of shock pads under artificial turf is becoming more common, especially in the increasing volume markets of contact sports such as Soccer, American Football, Rugby, Australian Rules football and Gaelic Football.

Most forms of shock pad can be engineered to provide satisfactory performance for the sports/bio-mechanical performance for certain sports but this can often compromise the performance requirements of other sports. Therefore the ability to design a turf system which is a true 'cross code', multiple use surfaces is limited.

For example, a surface which conforms to the highest Soccer performance criteria will not offer the required performance characteristics for a top level Australian Rules football surface.

EXAMPLES

The follow are examples of possible ratios of granules granule size range and binder content by weight, based against application:

Example 1

A structure consisting of particle sizes form 0.5 mm to 5 mm and a binder content of 10% by weight of granules will deliver increased properties for bio-mechanical values but decrease the civil engineering values. This kind of ratio suits areas where the underlying geology is stable, either from exist sub-soils/grades or where existing ATP are been renovated, hence the pre-existence of a stone base layer.

The layer offers a shock absorbent and safety value which still offers the properties of water management and some civil engineering values such as point and spread loading, allow some reduction in base construction depth, depending on the depth of the layer according to the invention.

Example 2

A structure consisting of particle sizes form 5 mm to 10 mm and a binder content of 15% by weight of granules will deliver good properties for bio-mechanical values and good values for civil engineering values. This kind of ratio suits the vast majority of applications as the required properties are balanced while offer excellent water management properties. The structure allows for a significant reduction in base construction depth, depending on the depth of the layer according to the invention.

Example 3

A structure consisting of particle sizes from 10 mm to 20 mm and a binder content of 20% by weight of granules will deliver decreased properties for bio-mechanical values but increased the civil engineering values. This kind of application suits areas where the underlying geo-graphical is un-stabile, or the demands of the end use require high civil values for point loading. The layer offers some shock absorbent value which still offers the properties of water management and increased ability for water storage within the layer according to the invention.

The strength of this structure further reduces the base construction depth depending on the thickness of the layer according to the invention.

The example listed above represent a Soft, Medium and Hard structures, but the adjustment of the granules granule size spread with the 0.5-20 mm range, plus the ratio of binder content, plus the depth of the layer gives the ability to design and formulate, tailor made solutions in all applications and environments. In some instances the layer according to the invention would benefit from the inclusion of non-plastic materials, such as rubber ganules, recycled glass chippings, stone chipping, lava stones and pea gravel. These inclusion will help assist added values in either sports performance values or civil engineering values.

Depending on the playing surface design and requirements the system would either be a single layer of material according to the invention; which would replace the standard 'dynamic' base construction profile. This layer is now referred to as the 'sub-grade course'.

In the case that the system requires a shock pad then a second layer (herein referred to as the 'performance course') would be placed on top of the sub-grade course.

Some applications may allow a composite single layer which would offer the required values for sub-grade and performance courses.

The sub-grade course is designed to act as the load bearing and drainage layer and replaces the vast majority of excavation depth and subsequent volume of rock required in standard construction profiles. The thickness of this layer can range from 10 mm to 100 mm depending on the underlying geological conditions. The layer can be composed using granules at granule size ratios which are formulated depending on the performance required, while parameters are influenced by the existing geological and drainage conditions, point loading and stability requirements. The nature of this layer allows the free flow of water both horizontally and vertically, therefore a standard field drainage system is not required.

If required, base profiling and design could allow water to be held within the sub-grade course. The benefit of this water retention would have a double benefit; firstly to create a mini artificial aquifer, thus allowing water to be retained and re-circulated to water fully-synthetic (water-based) Hockey pitches. Secondly, for pitches with infill systems, to help assist in cooling the playing surface; either by re-circulating water from the mini aquifer onto the playing surface, or through retaining moisture in the infill materials from the sub-grade layer up.

The two methods of installation of this sub-grade course would be:
1. Direct installation of the sub-grade course (in-situation method as described above) as shown in FIG. 5, and
2. Indirect installation of the sub-grade course (pre-formed method as described above) as shown in FIG. 6.

Figure 5:
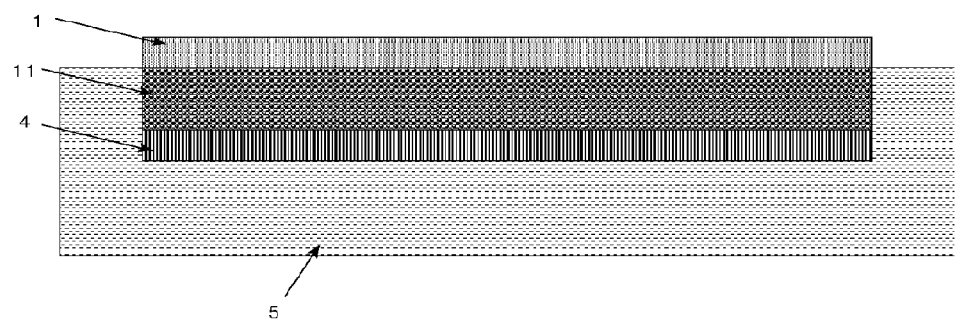
FIG. 5 represents the cross-section of an in-situation sub-grade course construction profile according to the invention.

FIG. 5 represents the cross-section of an in-situation sub-grade course construction profile:
1. Turf surface
11. In situation sub-grade course
4. Non-porous capping layer
5. Natural soils The materials are mixed together in the pre-determined ratios and a binding agent is added and mixed with the materials. The resulting mixture is paved directly onto the capping layer 4 in the same manner as asphalt, utilising the same machinery. While the skill level required ensuring correct levels and smoothness is still important, it is an existing skill with no new special requirements or training.

Figure 6:
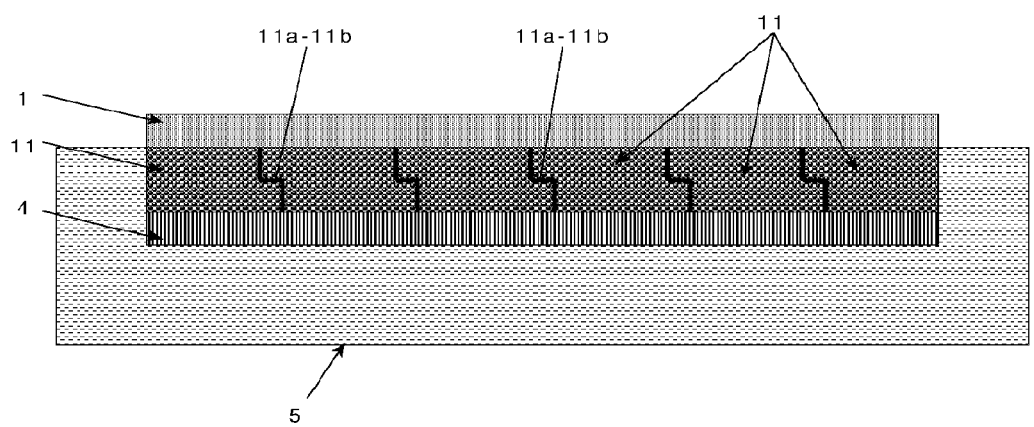
FIG. 6 represents the cross-section of a preformed sub-grade course in panel format construction profile according to the invention.

FIG. 6 represents the cross-section of a preformed sub-grade course in panel format construction profile:
1. Turf surface
11. Performed sub-grade course in panel format with inter-locking profile.
4. Non-porous capping layer
5. Natural soils The sub-grade course 11 can be manufactured off-site in panel format and then installed over the capping layer 4. The materials are mixed together in the pre-determined ratios and a binding agent is added and mixed with the materials. This resulting mixture can be extruded or moulded or formed as a mass and cut sliced or otherwise divided into separate panels, boards or tiles 11 which can have inter-locking faces 11a-11b to allow the panels 11 to be close fitting or locked together during on site installation.

The benefit of this delivery method is that the consistency of the layer 11 can be controlled under strict manufacturing conditions. The design of the panels 11 also allows quick and easy installation in all weather conditions with no specialised equipment required.

In a further improvement an additional performance course 12 (FIGS. 7 and 8) can be implemented in the overall construction. The performance course 12 is designed to act as a stable shock absorption layer with added point loading, replacing the wearing asphalt course and the in-situation or pre-formed shock pad. The thickness of this layer 12 can range from 5 mm to 100 mm depending on the shock absorption characteristics required. The layer can be composed of one or more of the materials described above, mixed in various ratios. These ratios are formulated depending on the performance required. The layer 12 is porous and displays the same water control and management characteristics as the sub-grade course described above.

The two methods of installation of this sub-grade course 12 would be:
1. Direct installation of the performance course onto sub-grade course (in-situation method described above) as shown in FIG. 7;
2. Indirect installation of the performance course onto sub-grade course (pre-formed method described above) as shown in FIG. 8.

Figure 7:
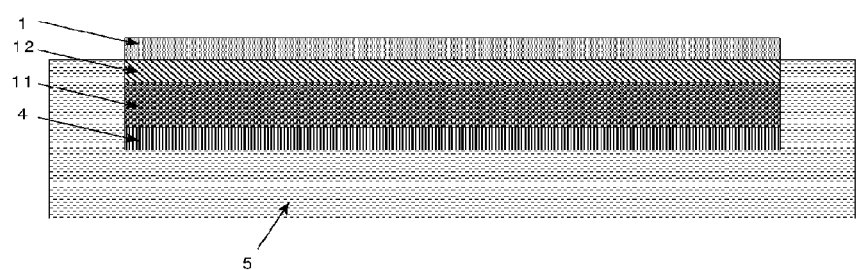
FIG. 7 represents the cross-section of an in-situation sub-grade course and performance course construction profile according to the invention.

FIG. 7 represents the cross-section of an in-situation sub-grade course and performance course construction profile:
1. Turf surface
12. In situation performance course
11. In situation sub-grade course
4. Non-porous capping layer
5. Natural soils The materials are mixed together in the pre-determined ratios and a binding agent is added and mixed with the materials. The resulting mixture 12 is paved directly onto the sub-grade course 11 in the same manner as asphalt, utilising the same machinery. The binder in the performance course 12 reacts with the cured binder in the sub-grade course 11 during installation so that both layers 11 and 12 are firmly locked together. While the skill level required ensuring correct levels and smoothness is still important, it is an existing skill with no new special requirements or training.

Figure 8:
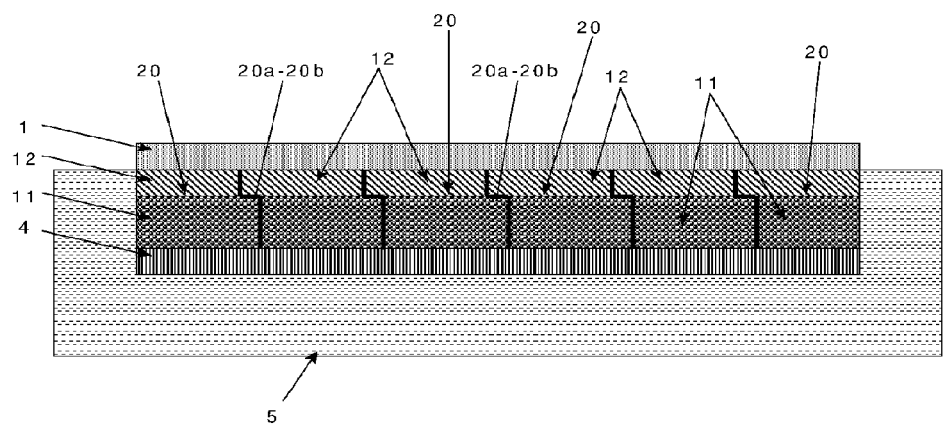
FIG. 8 represents a cross-section of a pre-formed dual-density performance course plus sub-grade course in panel format construction profile according to the invention.

FIG. 8 represents a cross-section of a pre-formed dual-density performance course 12 plus sub-grade course 11 in panel format construction profile 20:
1. Turf surface
20. Dual density panel format with inter-locking profile.
4. Non-porous capping layer
5. Natural soils As with the off-site manufacture of the sub-grade course 11 (described above with reference to FIG. 6) the separate panels 11 and 12 can be manufactured as 'dual density' panels 20. The materials for the sub-grade course 11 are still mixed together in the pre-determined ratios and a binding agent is added and mixed with the materials. This resulting mixture is extruded or moulded into panels 11 as before. However, there is a second step in which materials for the performance course 12 is still mixed together in the pre-determined ratios and a binding agent is added and mixed with the materials. These materials are then extruded or moulded on top of the sub-grade course or layer 11 to form two distinct layers within the same panel 20.

The panel now has all the properties required of the two courses 11 and 12. These panels are designed to have inter-locking 'male' and 'female' profiles 20a-20b. These profiles allow the separate panels 20 to be locked together during on site installation.

The benefit of this delivery method is that the consistency of the layer 20 can be controlled under strict manufacturing conditions. The design of the panels 20 also allows quick and easy installation in all weather conditions with no specialised equipment required.

Depending on the geological and sport performance specifications the system can be designed as a composite grade. The composite grade is one layer 13 which offers the performance of both the sub-grade course/layer 11 and performance course/layer 12. The performance is pre-determined by the selection of materials and the mixing ratios of those materials. This layer 13 can be installed either by the in-situation of pre-formed methods described above. The thickness of this layer can range from 5 mm to 100 mm depending on the characteristics required. The layer 13 is porous and displays the same water control and management characteristics as the other methods described above.

The two methods of installation of this composite course would be:
1. Direct installation of the composite course (in-situation method described above) as shown in FIG. 9;
2. Indirect installation of the composite course (pre-formed method described above) as shown in FIG. 10.

Figure 9:
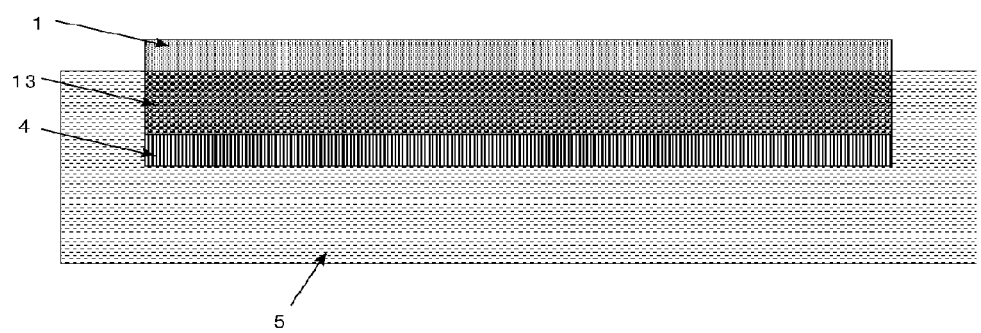
FIG. 9 represents the cross-section of an in-situation composite course construction profile according to the invention.

FIG. 9 represents the cross-section of an in-situation composite course construction profile:
1. Turf surface
13. In-situation composite course
4. Non-porous capping layer
5. Natural soils The materials are mixed together in the pre-determined ratios and a binding agent is added and mixed with the materials. The resulting mixture 13 is paved directly onto the capping layer 4 in the same manner as asphalt, utilising the same machinery.

While the skill level required ensuring correct levels and smoothness is still important, it is an existing skill with no new special requirements or training.

Figure 10:
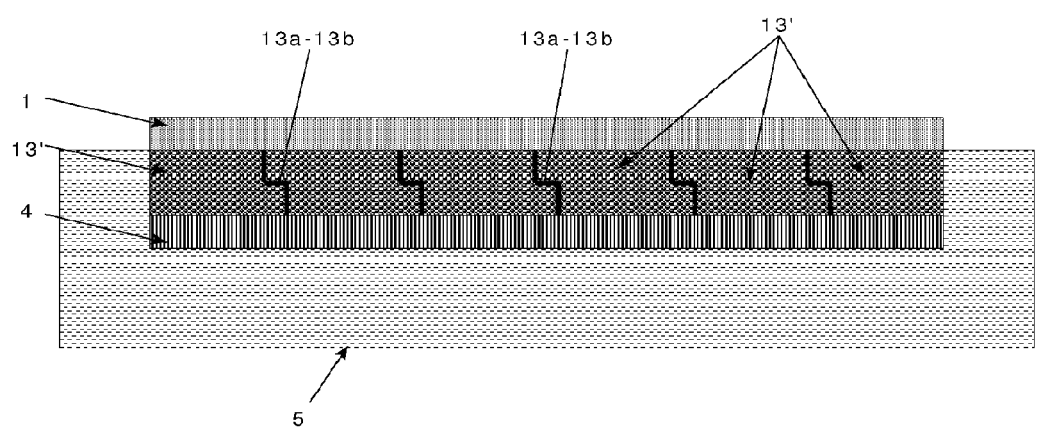
FIG. 10 represents the cross-section of a preformed Composite course in panel format construction profile according to the invention.

FIG. 10 represents the cross-section of a preformed composite course 13 in panel format construction profile:
1. Turf surface
13. Pre-formed composite course in panel format with inter-locking profile.
4. Non-porous capping layer
5. Natural soils The composite course 13 can be manufactured off-site in the panels 13' and then installed over the capping layer 4. The materials are mixed together in the pre-determined ratios and a binding agent is added and mixed with the materials. This resulting mixture is extruded or moulded into panels 13' which are designed to have inter-locking 'male' and 'female' profiles 13a-13b. These profiles allow the panels 13' to be locked together during installation.

The benefit of this delivery method is that the consistency of the layer 13 can be controlled under strict manufacturing conditions. The design of the panels 13 also allows quick and easy installation in all weather conditions with no specialised equipment required.

Figure 11:
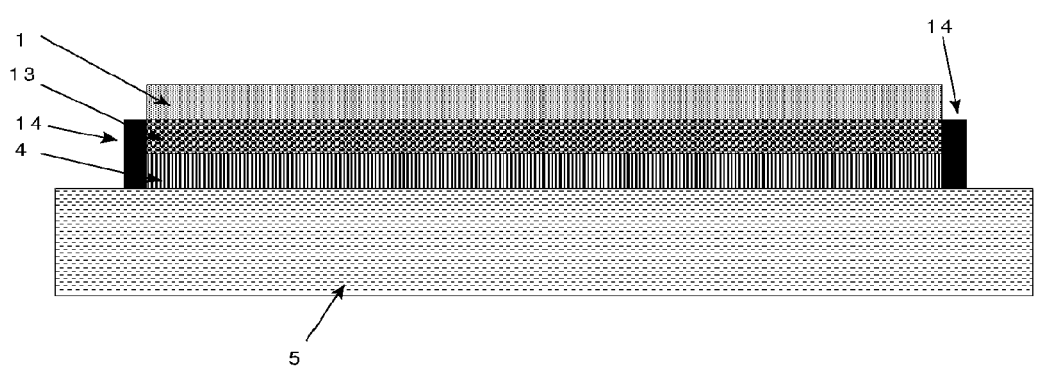
FIG. 11 represents the cross-section of an in-situation sub-grade course and performance course construction profile over an existing brown field substrate according to the invention.

In another embodiment shown in FIG. 11 it is now possible to construct ATP's on 'brown field' sites. Brown field sites can be defined as areas which have previously been used for some other purpose i.e. old landfill sites, disused industrial sites, education and housing areas etc. It is important to note that these areas of different from 'green field' sites, which are defined as areas that have had no previous usage apart from agriculture and/or natural land.

FIG. 11 represents the cross-section of an in-situation sub-grade course and performance course construction profile 14 over an existing brown field substrate 4-5:
1. Turf surface
14. Retaining curb stones
13. In situation or preformed sub-grade course
4. Non-porous capping layer
5. Exist brown field sub structure The preservation of green field areas is a high priority for national and local governments and it is preferable to re-use areas which have been made redundant. As a standard ATP base construction profile requires the excavation and removal of existing substrates below the level of the proposed pitch, this can pose a problem on brown field sites (depending on local conditions etc). If, for example, the proposed site is on an area of demolished industrial units, it is likely that the concrete and foundation will still be in-situation. Normally this would require complicated and costly removal. The principal system being proposed allows the pitch to be constructed over the existing ground without any removal.

The construction, base profiles and the installation methods described above (in-situation and pre-formed) remain the same and the capping layer 4 is formed over the exist ground 5. The composition and the thickness of the system depend over what type of surface is being constructed. For example, a construction over an existing concrete or rubble floor will already have a great deal of load bearing and spread capacity, therefore the design of the layers can be designed to concentrate on shock absorption and drainage.

As has been indicated in the preceding description of the invention there are significant opportunities for reducing the amount of excavation on green field sport sites and for avoiding the need to break up existing flat substrates, such as concrete floors, on brown field sites.

According to the invention a substrate is formed from granular plastics material, which has been coated in binder to form a stable, substantially incompressible, water permeable or water retaining substrate. Surprisingly it has been proven that a particularly suitable material for this purpose is "end of life" plastics material, which is the plastics material that current processes cannot any longer recycle, because of its chemistry, because it is has already been recycled, because it is dirty or otherwise difficult to sort. Not only does this have environmental advantages, because the material no longer has to go to landfill or incineration, the material is also preserved for future reuse, re-processing or recycling.

As is indicated this sub-base may be formed as preform parts, but it is particularly advantageously used by forming appropriate layers in situ using existing pavement pavers, which typically lay down a 2½ meter wide layer of self levelling material, without, essentially any compaction, the only pressure on the material being that of the grader or scraper bar. This not only enables the system to be used with existing technology and existing skills, it is readily open to a range of uses in accordance with local practices and will level out minor undulations in the surface on which it has been laid.

The absence of compaction means that the granular material will adhere to where it contacts other granular material leaving a pattern of voids through the material so that it is pervious to water. If it is laid on an impermeable surface, the nature of the material formed is such that water will become subject to lateral capillary action whereby the water is ejected through the side edges of the substrate frequently avoiding the need for drains to be formed underneath the substrate location. It also means that the substrate can be laid flat, without the need for drainage grading, which occurs in most existing arrangements.

The binding materials can be Polyurethane, Bitumen or Polyofin displacements and may form between 8 and 20% of the substrate. It is desirable that the granules have a range of sizes in order to provide a good pattern of voids.

The invention claimed is:

1. A method of forming substrate panels for a sports surface of a sports pitch comprising:
    a) Agglomerating feedstock comprising mixed plastics materials to form noodles of agglomerated plastics,
    b) Granulating the noodles to form granules having a predetermined range of sizes;
    c) Coating the granules with a binding material so that they form a fluent material;

d) Extruding, molding or forming a layer of the fluent material to form separate panels; and e) Setting the fluent material such that the granules adhere where they contact each other to form a voided water permeable structure with the void space in the range of 15%-60% by volume.

2. The method as claimed in claim 1 wherein the plastics material is "end of life" plastics material.

3. The method as claimed in claim 1 wherein the granules are substantially incompressible.

4. The method as claimed in claim 1 wherein the binding material is a Polyurethane, Bitumen or Polyolefin.

5. The method as claimed in claim 1 wherein step c) comprises extruding or moulding a second layer on top of the first layer and the bulk density of the layers is selected to provide a dual density panel.

6. The method as claimed in claim 1 wherein the layer is between 20 mm and 100 mm thick.

7. A substrate panel for a sports surface of a sports pitch obtained with the method according to claim 1.

8. A substrate panel for use as a substrate layer in a sports pitch, the panel comprising granules of agglomerated plastics materials, the granules having a predetermined range of sizes and being coated with a binding material, wherein the coated granules are molded into the shape of a panel and the fluent material is set such that the granules adhere where they contact each other to form a water permeable structure having voids, and wherein the granules are substantially incompressible with respect to the relatively more compressible binding material.

9. The substrate panel according to claim 8, wherein the plastics material is "end of life" plastics material.

10. The substrate panel according to claim 8, wherein the binding material is a Polyurethane, Bitumen or Polyolefin.

11. The substrate panel according to claim 8, further comprising a quantity of non-plastic materials, selected from the group consisting of: rubber granules, recycled glass chippings, stone chipping, lava stones and pea gravel.

12. The substrate panel according to claim 8, wherein the substrate panel is formed to have inter-locking side faces for interlocking abutting engagement with a similar panel.

13. The substrate panel according to claim 8, comprising first and second layers overlying each other and a bulk density of each of the layers is selected to provide a dual density panel.

14. The substrate panel according to claim 13, wherein at least one of the layers further comprises a quantity of non-plastic materials, selected from the group consisting of: rubber granules, recycled glass chippings, stone chipping, lava stones and pea gravel.

15. The substrate panel according to claim 8, wherein the panel is between 20 mm and 100 mm thick.

16. The substrate panel according to claim 8, wherein the granules are present with particle sizes from 0.5 mm to 5 mm and the binding material is present at a content of 10% by weight of granules.

17. The substrate panel according to claim 8, wherein the granules are present with particle sizes from 5 mm to 10 mm and the binding material is present at a content of 15% by weight of granules.

18. The substrate panel according to claim 8, wherein the granules are present with particle sizes from 10 mm to 20 mm and the binding material is present at a content of 20% by weight of granules.

19. A sports pitch comprising a plurality of substrate panels according to claim 8.

20. The substrate panel according to claim 8, wherein the with the void space is in the range of 15%-60% by volume.

* * * * *